No. 888,184. PATENTED MAY 19, 1908.
J. H. MOORE.
PLOW.
APPLICATION FILED JULY 30, 1906.
2 SHEETS—SHEET 2.
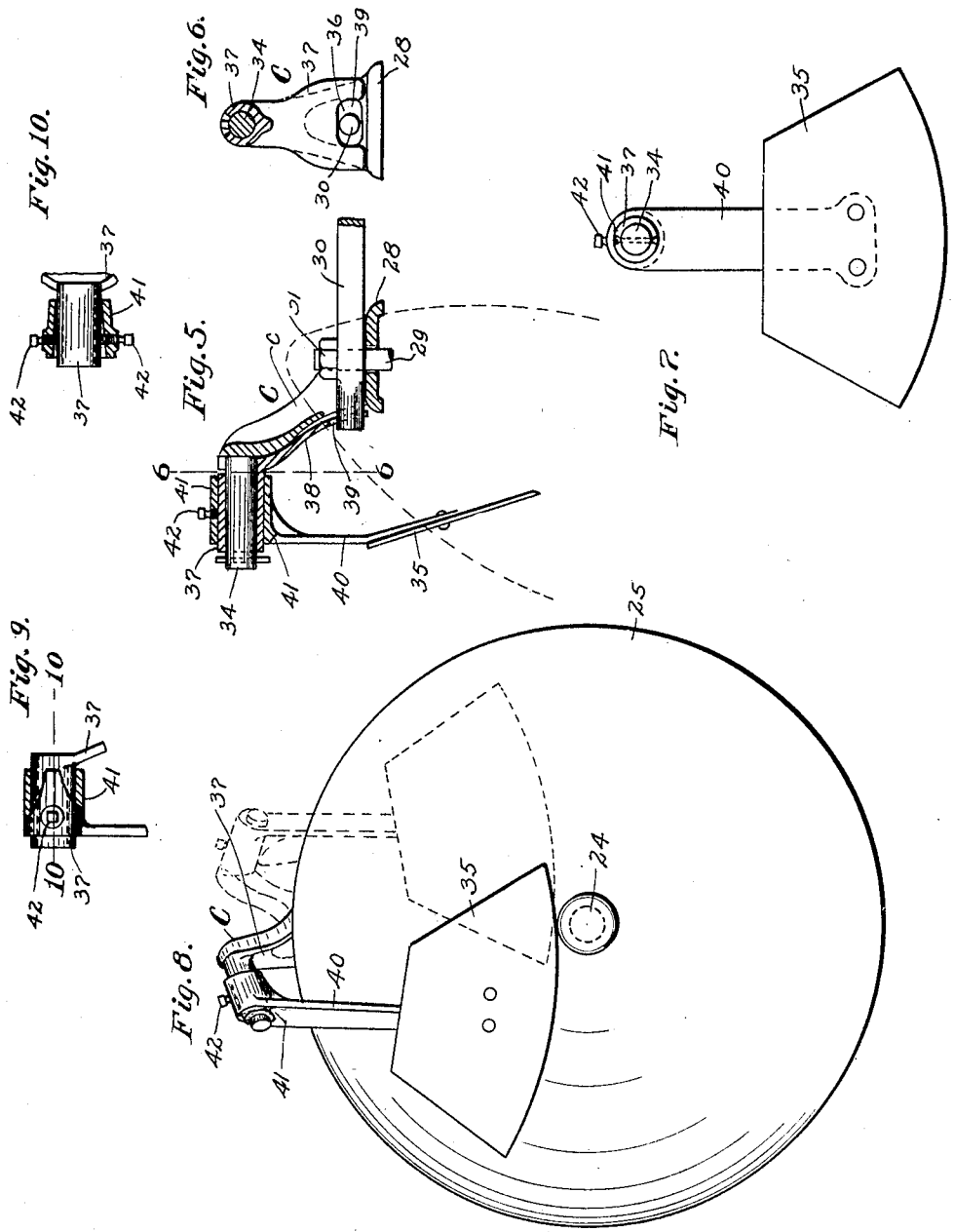
Witnesses,
Carrie R. Ivy
William Whaley
Inventor,
Josiah H. Moore
By Cyrus Kehr
Attorney.

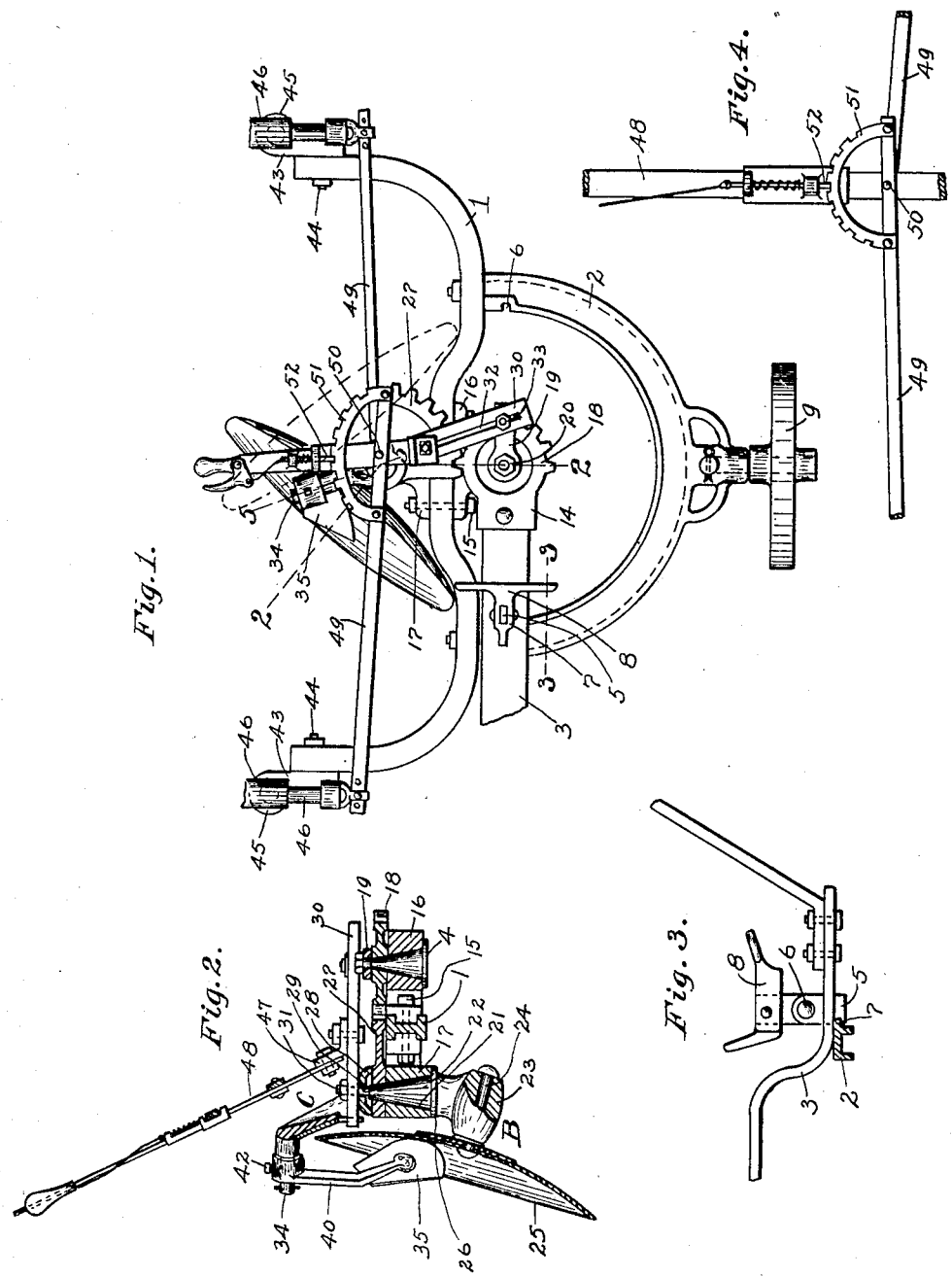

UNITED STATES PATENT OFFICE.

JOSIAH H. MOORE, OF CHATTANOOGA, TENNESSEE, ASSIGNOR TO CHATTANOOGA PLOW COMPANY, OF CHATTANOOGA, TENNESSEE, A CORPORATION OF TENNESSEE.

PLOW.

No. 888,184.　　　　　Specification of Letters Patent.　　　　　Patented May 19, 1908.

Application filed July 30, 1906. Serial No. 328,430.

*To all whom it may concern:*

Be it known that I, JOSIAH H. MOORE, a citizen of the United States, residing at Chattanooga, in the county of Hamilton and State of Tennessee, have invented a new and useful Improvement in Plows, of which the following is a specification, reference being had to the accompanying drawing.

My invention relates particularly to reversible mold-board plows, such plows being made reversible to adapt them to back-and-forth plowing on hill-sides.

My plow comprises a frame and the usual land wheel and two furrow wheels; and the object of my invention is to effect such a mechanical organization as will make possible an easy and effective control for said furrow wheels for giving the plow more or less land and as will effect efficient control of the scraper which is applied to the revolving mold-board.

My improvement is applicable to such a plow as is made the subject-matter of Letters-Patent of the United States No. 817,793, granted to me April 17, 1906.

In the accompanying drawings, Figure 1 is a plan of a plow embodying my improvement; Fig. 2 is a section on the line 2—2 of Fig. 1; Fig. 3 is a section on the line 3—3 of Fig. 1; Fig. 4 is a detail of the mechanism for controlling the furrow wheels; Fig. 5 is a section on the line 5—5 of Fig. 1; Fig. 6 is a section on the line 6—6 of Fig. 5; Fig. 7 is an elevation looking parallel to the axis of oscillation of the scraper; Fig. 8 is an elevation looking parallel to the axis of the revolving mold-board; Figs. 9 and 10 are detail views showing a modification of the hub of the scraper arm.

Referring to said drawings, 1 is the beam of the plow. The middle portion of said beam is approximately parallel to the line of draft, while its ends are bent to the same side so as to stand at right angles to said middle portions and approximately horizontal. To the middle portion of the beam, at the side of the latter opposite its ends is applied a semi-circular segment, 2. This segment and the beam, 1, together constitute the frame of the plow. Said segment constitutes a part of the support of the tongue, 3. The inner end of the tongue is pivoted on a bracket block, 16, secured to the side of the beam by means of horizontal bolts, 15, extending through said block and the beam and a similar bracket block, 17, located at the opposite side of the beam. Said bracket blocks have their upper faces approximately even with the upper face of the beam.

To the end of the tongue, 3, is applied the gear block, 14. Said gear block, 14, terminates in a segment gear, 18, and a conical member, 4, extends upward through said bracket block, 16, and said segment gear, 18, axially in line with the latter. Above said gear, said conical member is surrounded by an arm, 19, and a nut, 20, said arm being held rigidly upon said segment gear. The axial line of said conical member may be termed the upright axial line of the plow. By means of an upright latch bar, 5, the tongue, 3, is secured to the segment, 2, where said tongue and segment cross each other. Said latch bar extends downward through the tongue between ears, 6, rising from the tongue and is journaled in said ears in proper position to adapt it to enter one of the notches, 7, formed on the inner edge of the segment, 2. To the upper end of said bar is secured a cross-head, 8, which extends to opposite sides of the axis of oscillation of said bar, the heavier part of said cross-head being toward the axial line of the plow, in order that said bar may be normally tilted so as to press its lower end toward the segment, 2, and cause said end to automatically enter the notches, 7. When the plow is to be reversed, the foot of the driver is pressed against the forward portion of said cross-head whereby said latch bar is tilted, the lower end going away from the segment, 2, and out of the notch, 7. The tongue is then swung horizontally upon said segment until said latch bar enters the opposite notch, 6.

The bracket block, 17, is penetrated by an upright bearing, 21, and in said bearing rests the journal, 22, of an upright rotary member, B, said member extending above and below said block. Below said block, said member is formed to constitute an approximately horizontal hub, 23, to receive the journal, 24, of the rotary mold-board or disk, 25. A shoulder, 26, on said member, B, bears against the lower face of said bracket block, 17. The journal, 22, rises above the bracket block, 17, and is surrounded by a segment gear, 27, which intermeshes with the segment gear, 18. Said segment gear is immovably secured to said journal, so that when the tongue, 3, is turned upon its pivot, the segment gear, 18, will turn the segment gear, 27, and cause the latter to turn the member, B, and partially revolve the disk, 25, bodily around the axis of the upright journal, 24. The relation of said segment gears, 18 and 27, is such as that a movement of the tongue, 3, through 180 degrees of a circle will cause the member, B, to rotate less than 180 degrees—only far enough to cause the disk, 25, to shift to the proper angle to adapt the plow for movement in the reverse direction.

Above the segment gear, 27, the base, 28, of a standard, C, surrounds a neck, 29, which constitutes the upper end of the member, B. Above said base said neck is surrounded by a horizontal bar, 30, and above said bar a nut, 31, surrounds said neck, said bar, 30, being held loosely so that it and the member, B, may have relative rotation. The opposite end of said bar is provided with a longitudinal upright slot, 32, into which extends a wrist, 33, rising from the arm, 19. Thus it will be seen that the end of said bar which surrounds said neck, 29, is pivoted upon a relatively stationary upright axis, while the opposite end is arranged to be oscillated through a limited portion of a circle by the movement of the wrist, 33, through one-half of a circle (when the tongue, 3, is moved through a half circle). The standard, C, has an opening, 36, through which the adjacent end of the bar, 30, extends, and said standard has at each side of and close to the bar, 30, a web or flange, c, whereby the standard is held immovable, except when the bar, 30, is oscillated, at which times the standard is oscillated with the arm. The standard, C, has a wrist, 34, projecting horizontally across the upper edge of the disk, 25. The function of said wrist is to support the scraper, 35, which rests adjacent the front face of the disk and at one side of an upright line cutting the axis of the latter. The wrist, 34, is loosely surrounded by a sleeve, 37, from which sleeve depends an arm, 38, the lower end of which arm is provided with an opening, 39, into which the end of said bar, 30, extends, said end being smaller than said opening, so that said arm is coupled to the bar, 30, in such manner as to allow a small range of oscillation of said arm whereby the sleeve, 37, is partially rotated. This allows a limited self-adjustment of the scraper, as will appear below. The scraper, 35, is attached to the lower end of an arm, 40. The upper end of said arm is provided with a sleeve, 41, which surrounds the sleeve, 37. A set-bolt, 42, extending downward through the sleeve, 41, serves to bind said sleeve to the sleeve, 37, whereby the scraper, scraper arm, sleeves, 41 and 37, and the arm, 38, become a rigid member resembling a bell-crank. Normally the scraper stands at one side of an upright line cutting the disk axis, so as to operate upon the portion of the disk which is away from the "land." When the plow is reversed, the scraper must be brought to the opposite side of the disk axis. This is accomplished by means of the engagement between the standard, C, and the adjacent end of the bar, 30, the scraper moving less than the disk. After loosening the set-bolt, 42, the scraper may be adjusted by turning it partially upon the sleeve, 37, whereby it is moved in a plane parallel to the disk, and also by moving it lengthwise upon the sleeve, 37, whereby the scraper may be set nearer to or farther from the face of the disk.

By means of the modification illustrated by Figs. 9 and 10, the scraper may also be adjusted by partial rotation upon an axis which is upright and radial to the sleeve, 37. In said modification, the inner end of the sleeve, 41, is circular in cross-section, while from said inner end to the outer end, said sleeve is expanded laterally, in both directions, so as to become oval in cross-section, and a set-bolt, 42, is applied through each side of the sleeve, 41 (instead of through the top as shown in Fig. 5), and by retracting one of said set-bolts and driving the other forward, said sleeve, 41, may be set so that its axis will turn laterally and assume an angle to the axis of the sleeve, 37, and the wrist, 34, whereby the scraper is slightly turned on an upright axis. Such adjustment facilitates placing the lower edge of the scraper into proper relation with the face of the disk. The same result would be attained by expanding the inner end of the sleeve, 41. These several adjustments make it possible to so set the scraper as to prevent it from bearing against the disk and operate as a friction brake. This is a desirable result which has not, so far as I know, been heretofore accomplished.

The land wheel, 9, is applied to the middle portion of the segment, 2, while the furrow wheels (not shown) are applied to the ends of the beam 1. Against the side of the beam, 1, at each end of the latter is bolted a block, 43, by means of a transverse, horizontal bolt, 44, extending through said block and beam. Integral with said block is an upright sleeve or bearing, 45. Into each such bearing is journaled the furrow wheel crank, 46, by means of which the usual furrow wheel (not shown in the drawings) is supported and controlled. By the partial rotation of said furrow wheel cranks in said bearings, the furrow wheels are turned so as to cause the plow to take more or less land, as is well known in this art.

To the middle portion of the upper face of the bar, 30, is bolted a short leaning standard, 47, and to said standard is hinged a rack lever, 48. To each furrow wheel crank, 46, is coupled one end of a reciprocatory link or bar, 49, the opposite ends of said bars being hinged to said rack lever at 50. One of said bars, 49, extends a short distance beyond said hinge, 50, and a toothed segment rack, 51, is secured immovably upon said bar concentric with said hinge, 50, and in operative relation with said lever, the locking bolt, 52, engaging said rack. By shifting said rack lever, said bars, 49, are together moved forward or backward, turning said furrow wheel cranks simultaneously in the same direction. Thus supporting said bars, 49, upon said rack lever and supporting said segment rack upon one of said bars forms a simple, economical, and efficient construction.

It will be observed that with each reversal of the tongue, the standard, 47, will be shifted a short distance in the arc of a circle which is concentric to the axis of the member, B, and the bars, 49, and the furrow wheel crank are therefore automatically shifted to a limited degree with each reversal of the tongue.

I claim as my invention:

1. The combination with a plow frame adapted for two-way draft, a reversible tongue and two furrow wheel cranks, of a hinged rack lever, an automatically shiftable support for said rack lever in operative relation with said tongue, two bars coupled to said furrow wheel cranks and to said rack lever, and a rack secured to one of said bars in operative relation with said lever, substantially as described.

2. The combination with a plow frame and a hinged tongue, of a horizontal bar hinged by one end on a relatively stationary upright axis and coupled to said tongue by a crank-form connection, a rack lever mounted upon said bar, two furrow wheel cranks, two bars coupled by one end to said furrow wheel cranks and by the other end to said rack lever, and a rack secured to one of said bars in operative relation with said rack lever, substantially as described.

3. The combination with a plow frame, and a hinged tongue, of an upright rotary member, B, a disk applied to said member, a scraper standard having a wrist projecting over said disk, a sleeve hinged upon said wrist, an arm projecting from said wrist and being in operative relation with said tongue, an arm extending downward from said sleeve, and a scraper applied to said arm, substantially as described.

4. The combination with a plow frame, and a hinged tongue, of an upright rotary member, B, a disk applied to said member, a scraper standard having a wrist projecting over said disk, a sleeve hinged upon said wrist, an arm projecting from said wrist and being in operative relation with said tongue, an arm adjustably secured to said sleeve, and a scraper secured to said arm, substantially as described.

5. The combination with a plow frame, and a hinged tongue, of an upright rotary member, B, a disk applied to said member, a scraper standard having a wrist projecting over said disk, a sleeve hinged upon said wrist, an arm projecting from said wrist and being in operative relation with said tongue, an arm longitudinally and radially adjustable upon said sleeve, and a scraper secured to said arm, substantially as described.

6. The combination with the frame, hinged tongue, and disk, of a scraper standard having an approximately horizontal wrist extending over the upper edge of said disk, a loose sleeve having an arm in operative relation with said tongue, a second sleeve surrounding said first sleeve slidably and rotatably adjustable thereon, means for securing said sleeves immovably to each other, an arm extending downward from said second sleeve, and a scraper attached to said arm, substantially as described.

7. The combination with a plow frame and a rotary disk, of a scraper standard having a wrist, a sleeve expanded laterally at one end, means for securing said sleeve to said wrist, a scraper arm extending downward from said sleeve, and a scraper applied to said arm, substantially as described.

In testimony whereof I have signed my name, in presence of two witnesses, this 27th day of July, in the year one thousand nine hundred and six.

JOSIAH H. MOORE.

Witnesses:
JUDSON BUCHANAN,
C. E. LANDIS.